(12) United States Patent
Arbatti et al.

(10) Patent No.: US 11,283,896 B2
(45) Date of Patent: Mar. 22, 2022

(54) METHODS FOR IMPLEMENTING A FRAMEWORK FOR CONSUMPTION OF SERVICES FOR ENTERPRISE CLOUD PLATFORMS

(71) Applicant: JPMorgan Chase Bank, N.A., New York, NY (US)

(72) Inventors: Varun Vinod Arbatti, Singapore (SG); Lois Blanc, Singapore (SG); Arghya Sadhu, West Bengal (IN); Neil Aitken, Jackson Heights, NY (US); Hans Adrian, Singapore (SG)

(73) Assignee: JPMorgan Chase Bank, N.A., New York, NY (US)

( * ) Notice: Subject to any disclaimer, the term of this patent is extended or adjusted under 35 U.S.C. 154(b) by 113 days.

(21) Appl. No.: 16/380,151

(22) Filed: Apr. 10, 2019

(65) Prior Publication Data
US 2020/0329117 A1   Oct. 15, 2020

(51) Int. Cl.
| | | |
|---|---|---|
| *G06F 15/16* | (2006.01) | |
| *H04L 67/60* | (2022.01) | |
| *H04L 29/06* | (2006.01) | |
| *H04L 67/51* | (2022.01) | |
| *H04L 67/10* | (2022.01) | |

(52) U.S. Cl.
CPC .............. *H04L 67/32* (2013.01); *H04L 63/08* (2013.01); *H04L 67/10* (2013.01); *H04L 67/16* (2013.01)

(58) Field of Classification Search
CPC ......... H04L 67/32; H04L 63/08; H04L 67/10; H04L 67/16

USPC ............ 709/201, 204, 246; 705/14, 2, 26.1; 717/135, 121, 104; 726/4, 28
See application file for complete search history.

(56) References Cited

U.S. PATENT DOCUMENTS

| | | | |
|---|---|---|---|
| 8,185,962 B2 * | 5/2012 | Moore ................ | H04L 41/5067 726/28 |
| 2004/0030627 A1 * | 2/2004 | Sedukhin ................ | H04L 67/02 705/36 R |

(Continued)

OTHER PUBLICATIONS

Notification of Transmittal of the International Search Report and the Written Opinion in PCT/US20/24453 dated Jul. 1, 2020.

*Primary Examiner* — Thuong Nguyen
(74) *Attorney, Agent, or Firm* — Hunton Andrews Kurth LLP (57) ABSTRACT

An embodiment of the present invention is directed to a framework for consumption of services for enterprise cloud platforms. A method implements a framework for consumption of services for enterprise cloud platforms and comprises the steps of: implementing a platform component that builds, deploys and operates a plurality of cloud platform instances in a plurality of regions, wherein the platform component bridges each of the plurality of cloud platforms and service provider APIs; and providing a service framework registry that stores data associated with one or more services to be consumed by each cloud platform and stores constraint and policy metadata wherein the platform component is synchronized with the service framework registry; wherein one or more service providers provide services for execution on the cloud platform via the service provider APIs and in accordance with one or more credentials required for service consumption at run time.

20 Claims, 3 Drawing Sheets

(56) References Cited

U.S. PATENT DOCUMENTS

| | | | |
|---|---|---|---|
| 2004/0193731 A1* | 9/2004 | Mitchell | H04L 67/303 |
| | | | 709/246 |
| 2009/0024411 A1* | 1/2009 | Albro | G16H 15/00 |
| | | | 705/2 |
| 2012/0180029 A1* | 7/2012 | Hill | G06F 8/70 |
| | | | 717/135 |
| 2012/0210304 A1* | 8/2012 | Maeno | G06F 9/445 |
| | | | 717/121 |
| 2013/0232498 A1* | 9/2013 | Mangtani | G06F 9/5038 |
| | | | 718/104 |
| 2014/0040343 A1 | 2/2014 | Nickolov et al. | |
| 2014/0372533 A1* | 12/2014 | Fu | G06F 9/5072 |
| | | | 709/204 |
| 2015/0188927 A1* | 7/2015 | Santhi | H04L 67/1002 |
| | | | 726/4 |
| 2016/0088064 A1* | 3/2016 | Chen | H04M 1/72412 |
| | | | 709/204 |
| 2016/0094563 A1* | 3/2016 | Arsanjani | H04L 63/107 |
| | | | 726/4 |
| 2016/0350274 A1* | 12/2016 | Deng | G06F 16/25 |
| 2018/0131724 A1 | 5/2018 | Martinez et al. | |
| 2018/0165070 A1* | 6/2018 | Khambay | G06F 8/35 |
| 2018/0288028 A1* | 10/2018 | Buck | H04L 63/083 |
| 2019/0079505 A1* | 3/2019 | Wu | G06F 3/0482 |
| 2019/0166209 A1* | 5/2019 | Mueller | H04L 67/16 |
| 2020/0067933 A1* | 2/2020 | Kukreja | G06F 21/6236 |
| 2020/0133737 A1* | 4/2020 | Gunaratne | G06F 9/5072 |
| 2020/0327221 A1* | 10/2020 | Street | H04L 63/1425 |

\* cited by examiner

METHODS FOR IMPLEMENTING A FRAMEWORK FOR CONSUMPTION OF SERVICES FOR ENTERPRISE CLOUD PLATFORMS

FIELD OF THE INVENTION

The invention relates generally to a method for implementing a framework for consumption of services for enterprise cloud platforms.

BACKGROUND OF THE INVENTION

Orchestrating service discovery, provisioning and upgrading services across platforms are often bespoke, complex and manual, limiting agility and cloud platform adoption by developer teams. Services are often run by geographically distributed teams across the enterprise and are run on different cloud or non-cloud platforms, using bespoke set of APIs (Application Program Interface) to manage the entire service lifecycle. Requiring services to have platform specific implementation for service consumption is onerous and inefficient. Moreover, once services are exposed to a cloud platform, there is no way to define any scoping of services.

Additionally, some types of services may need to be exclusively available in a few regions or locations. Some services may need to be made available for a few environment types and excluded from certain environments.

These and other drawbacks exist.

SUMMARY OF THE INVENTION

According to one embodiment, the invention relates to a method that implements a framework for consumption of services for enterprise cloud platforms. The method comprises the steps of: implementing a platform component that builds, deploys and operates a plurality of cloud platform instances in a plurality of regions, wherein the platform component bridges the plurality of cloud platforms and service provider APIs; and providing a service framework registry that stores data associated with one or more services to be consumed by each cloud platform and stores constraint and policy metadata wherein the platform component is synchronized with the service framework registry; wherein one or more service providers provide services for execution on the cloud platform via the service provider APIs.

According to another embodiment, the invention relates to a system that implements a framework for consumption of services for enterprise cloud platforms. The system comprises: a platform component that builds, deploys and operates a plurality of cloud platform instances in a plurality of regions, wherein the platform component bridges each of the plurality of cloud platforms and service provider APIs; and a service framework registry that stores data associated with one or more services to be consumed by each cloud platform and stores constraint and policy metadata wherein the platform component is synchronized with the service framework registry; wherein one or more service providers provide services for execution on the cloud platform via the service provider APIs and in accordance with one or more credentials required for service consumption at run time.

The system may include a specially programmed computer system comprising one or more computer processors, interactive interfaces, electronic storage devices, and networks.

The computer implemented method and system described herein provide unique advantages to entities, organizations and other users, according to various embodiments of the invention. Large numbers of enterprises are embracing the elastic nature of cloud platforms to run applications and data workloads. As enterprises transition workloads to run on the cloud, applications need to consume services from multiple cloud platforms (e.g., AWS®, GCP®, AZURE® or Private Cloud Infrastructure). However, cloud platforms are not unified and are not designed to work in collaboration with other providers and platforms. An embodiment of the present invention enables applications running on a single cloud platform to discover, provision and consume services running on different cloud and non-cloud platforms to leverage the full potential of hybrid cloud platforms. An embodiment of the present invention facilitates distribution of services onto multiple cloud platforms and further removes the complexities that are inherent in current cloud platforms. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to extending an existing Open Service Broker API™ specification to manage an entire service lifecycle and service migration across multiple cloud platforms.

According to an exemplary embodiment, the framework may include three representative components including Service Provider (SP), Platform Component (PC) and Service Framework Registry (SFR).

The Service Provider (SP) may build, own and/or run services. Services may be broadly classified into categories such as Data, Messaging, Logging, Monitoring, API gateways, etc. The service provider may implement a standard API to manage service discovery, provisioning and consumption. The SP API may be protected using a standard, such as OPENID CONNECT® (OIDC) standard, to ensure only trusted components are allowed to manage a service lifecycle. For example, the Service Provider broker may register itself against a Service Framework Registry (SFR). The SP API may expose a health endpoint, which may be used by the platform to infer provisioning health, quota availability and/or handle error scenarios.

The Platform Component (PC) may represent an entity that builds, deploys and/or operates different cloud platform instances in multiple datacenter and zones. For example, the PC may run an implementation of the SP API, which may act as a bridge between a Cloud platform (e.g., KUBERNETES®, PIVOTAL CLOUD FOUNDRY®, etc.) and the SP API. The PC may act as a generic service broker acting on behalf of some or all the SP APIs within the boundary of the platform. The PC may communicate with the SP API using a standard, such as the Open Service Broker API specification, and with the Platform using platform specific authentication mechanism (e.g., Basic Authentication, OAuth tokens, etc.).

For example, the PC may be periodically synchronized with the SFR for a list of services to be published on the platform and the corresponding constraint information that may be applied to limit service plan visibility and scope. Additionally, the Platform Component may perform various tasks including synchronizing with the SFR periodically to onboard services to a marketplace component, allowing for service discovery and consumption. Platform Component may also scope services based on type, location, cloud platform type, environment and/or other parameters. Other tasks may include encrypting and/or decrypting credentials provided by the service as well as adding firewall rules to enable bi-directional communication from applications to service instances.

Service Framework Registry (SFR) may represent a component that stores information about services that are whitelisted to be consumed by platforms and further stores constraint and policy metadata. The metadata may be used to identify various services, including Scope Services by location, Scope Services by environment, etc. For example, Scope Services by location may include zone, data center, region, etc. The policy metadata may specify locations where services are run as certain service providers that may not have the infrastructure to run in a specific location or may not have the necessary regulatory clearance to run (e.g., General Data Protection Regulation (GDPR), etc.)

According to another example, Scope Service plans may be identified by environment. The constraint metadata may specify locations where services are run as certain services and plans may only be consumed by applications running in less privileged environments (e.g., shared plans for data services cannot be used in production environments). An embodiment of the present invention may be implemented on a Cloud Platform (Platform as a Service) and deployed to multiple environments and regions. The framework workflow may be structured into multiple distinct phases. For illustration purposes, a use case may involve when a service, e.g., a hosted NoSQL database, may be made available to multiple cloud platforms to run different types of workloads.

An embodiment of the present invention is directed to a Service Framework (SF) that provides a single unified umbrella allowing for service providers to build a platform agnostic provisioning mechanism allowing for a single API implementation, while allowing consumption from multiple platforms across regions.

The Service Framework of an embodiment of the present invention may allow for service scoping based on region, location, environment and/or various parameters, providing Platforms and Service Providers a fine-grained control over service filtering and promotion mechanism across cloud platforms, locations and environments.

An embodiment of the present invention may provide zero deployment service publishing. In addition, upgrades to service plans and new service on-boarding may require little or no platform deployment and may be independent of the platform type.

An embodiment of the present invention may further support sharing service instances across multiple regions and cloud platforms. In order to gain an additional dimension of resiliency, the Service Framework of an embodiment of the present invention may allow the same or similar backing service instance to be shared by multiple cloud platforms, allowing applications to move seamlessly between cloud platforms.

An embodiment of the present invention may further provide accelerating cloud platform adoption by on-boarding services to different types of cloud platforms, across different regions. The Service Framework of an embodiment of the present invention may enable platforms to add services rapidly, making cloud platforms more usable and robust.

The Open Service Broker (OSB) API may represent an API specification that may be used in projects such as CLOUD FOUNDRY® and Service Catalog. An embodiment of the present invention may extend the OSB API to work in a multi-platform, multi-cloud environment.

An embodiment of the present invention may discover services, provision instances agnostic of cloud platforms, promote services across region and environments. These services and functions may be integrated with various platform and service deployment mechanisms. Further, an embodiment of the present invention may support the ability to automatically configure network layer and handle security credentials to further enable application teams to automate steps in deployment that are often manually configured and typically error prone. An embodiment of the present invention also provides the ability to share service instance metadata across cloud platforms that further enables developer teams to build a higher degree of resiliency and automation into their deployments.

The Service Framework of an embodiment of the present invention may define standards and set direction for cross cloud platform service consumption. With an embodiment of the present invention, enterprises may transition from using a single cloud platform towards using multiple cloud platforms. The Service Framework of an embodiment of the present invention may strategically help platforms, service providers and developers consume services across platforms in a secure manner, while reducing deployment and operational effort. The Service Framework of an embodiment of the present invention may provide a single unified umbrella framework for service providers to write a service once, and allow for applications from multiple platforms to consume the service, helping accelerate cloud platform consumption.

With an embodiment of the present invention, service scoping and promotion mechanism has potential to define zero deployment service upgrades and region-specific service publishing, allowing SP to iterate faster, independent and agnostic of multiple platforms.

Further, an embodiment of the present invention may be used to track service consumption across regions, platforms and environments, build billing and audit systems and to provide both an aggregate and a granular management and operational view for platforms, services and developers.

An embodiment of the present invention may be extended to include various features including automated credential injections, advanced service scoping; observability of service instances; self-service on boarding; service catalogs for new platforms and billing.

Figure 1:
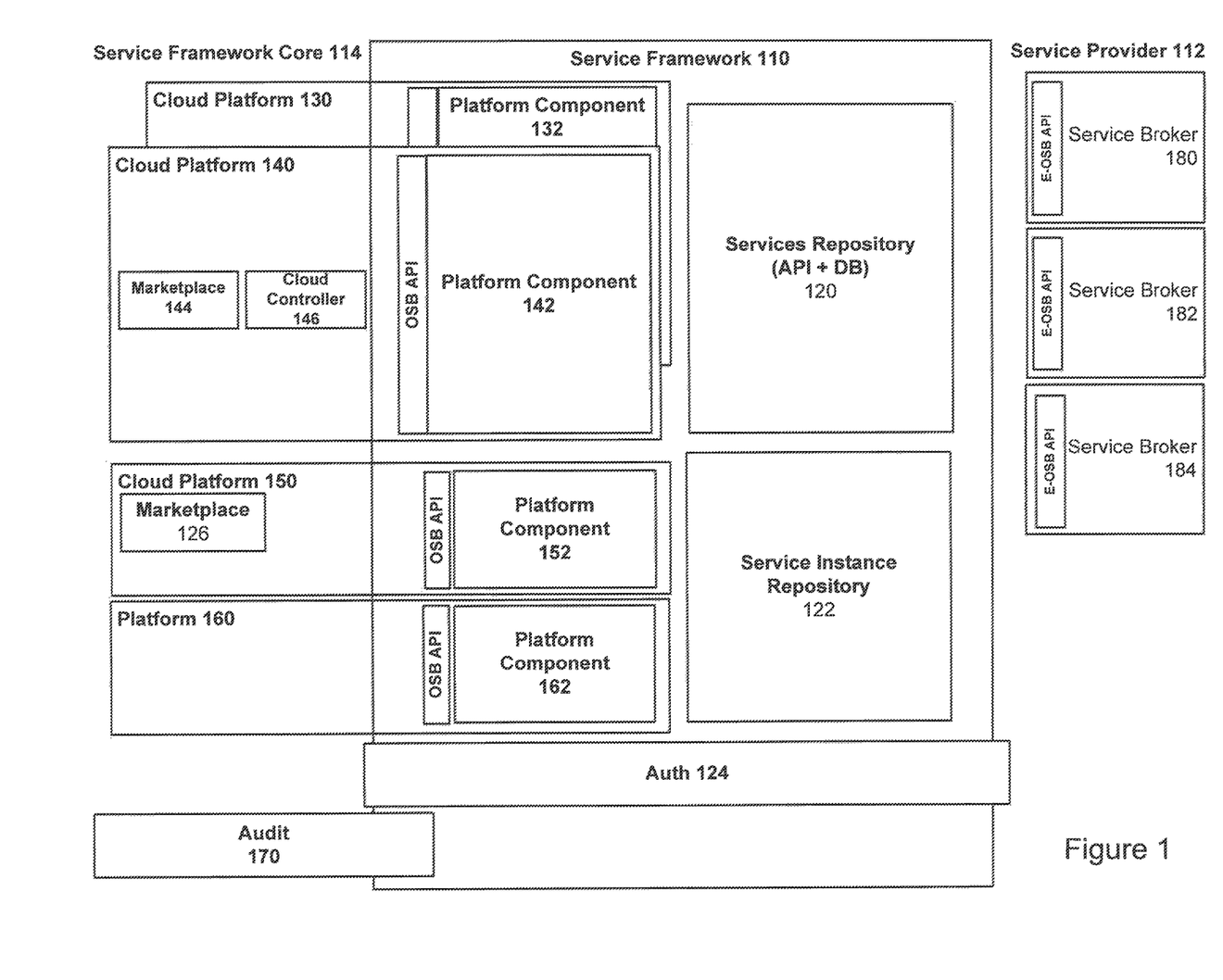
FIG. 1 illustrates a system implementing a Service Framework, according to an embodiment of the present invention.

FIG. 1 illustrates a system implementing a Service Framework, according to an embodiment of the present invention. FIG. 1 shows Service Framework (SF) 110, Service Provider (SP) 112 and Service Framework Core 114.

Service Framework (SF) 110 may include Services Repository 120, Service Instance Repository 122 and Auth 124. Services Repository 120 may register services to Service Framework. Services Repository 120 may be platform independent as well as region and environment aware. For example, registration may follow a specific syntax, such as platform service creation syntax that may be represented as "sf create-service-broker -p (config)." Services Repository may further support scoping constraints DSL such as {Platform, Region, Environment}. Service Instance Repository 122 may record global view of instances provisioned with Service Framework (SF). Service Instance Repository 122 may manage Cloud environment, Organizational, Platform instance, and SP Service instance mapping. Service Instance Repository 122 may enable retrieving of existing instance in other Cloud environments and/or platforms and further enable external service instance deletion pre-checks. Auth 124 may represent a Platform to PC that may be Platform dependent, e.g., SF to SP: OAuth. In addition, Auth 124 may represent App to Service: Service Dependent (e.g., Functional Account based auth, OAuth).

Auth may represent authentication which refers to confirmation of the truth of an attribute of a single piece of data claimed true by an entity. This may be contrasted with identification which may refer to stating or otherwise indicating a claim purportedly attesting to a person or thing's identity. Authentication may represent the process of actually confirming that identity. For example, it may involve verifying the authenticity of a website or software component with a digital certificate. According to an embodiment of the present invention, the PC may need to be sure that the instructions it receives are genuinely coming from the platform. The SPs may need to be sure that an API call it receives comes from a valid, genuine PC, for example, for the components. Failure to authenticate components may make Denial of Service (DOS) attacks easy, as anyone could provision new service instances. The process of authorization may be distinct from that of authentication, where authentication may refer to the process of verifying that "you are who you say you are," authorization may refer to the process of verifying that "you are permitted to do what you are trying to do." This does not mean authorization presupposes authentication; an anonymous agent could be authorized to a limited action set. Oauth (current version is OAuth 2.0) may represent a standard to perform Authorization. OPENID CONNECT® (OIDC) may represent an authentication layer built on top of OAuth 2.0.

Service Providers may include various service brokers represented by 180, 182 and 184. Each service broker may also include a corresponding API. For example, the API may represent an Open Service Broker (OSB)-API enriched with metadata. The metadata may be from a financial institution or other entity.

Service Framework Core 114 may include various platforms and capabilities that may be required or used by one or more Service Providers 112 who want to deliver a service through Service Framework 110. According to an exemplary application, platforms may include Cloud Platforms 130, 140, Cloud Platform 150 and Platform 160. Cloud Platform may a platform, such as CLOUD FOUNDRY® and KUBERNETES®. CLOUD FOUNDRY® may represent an application platform as a service that enables enterprises across an entity and/or industries to build, share and deploy services and applications. KUBERNETES® may represent a portable, extensible open source platform for managing containerized workloads and services. KUBERNETES® may host a marketplace that may be owned by Service Framework. Other platforms may be implemented.

Cloud Platforms 130, 140 may further include a PC represented by 132 and 142. PC may expose services to the platform. For example, PC may support service instance usage X-PLATFORM® and X-CLOUD® Environment, enterprise entitlements, service scoping and network white listing of service instance at bind time. Cloud Platform 150 may include a corresponding PC 152 that provides same or similar functionality as 132 and 142. Cloud Platform 150 may support platform independent marketplace, represented by 126. In a similar manner, Platform 160 may include a corresponding PC. Platform 160 may support various platform independent marketplaces.

Audit 170 may allow an audit of service instances lifecycle. Audit 170 may also reuse existing platform capabilities enriched with information from Service repository and/or Service registry.

Figure 2:
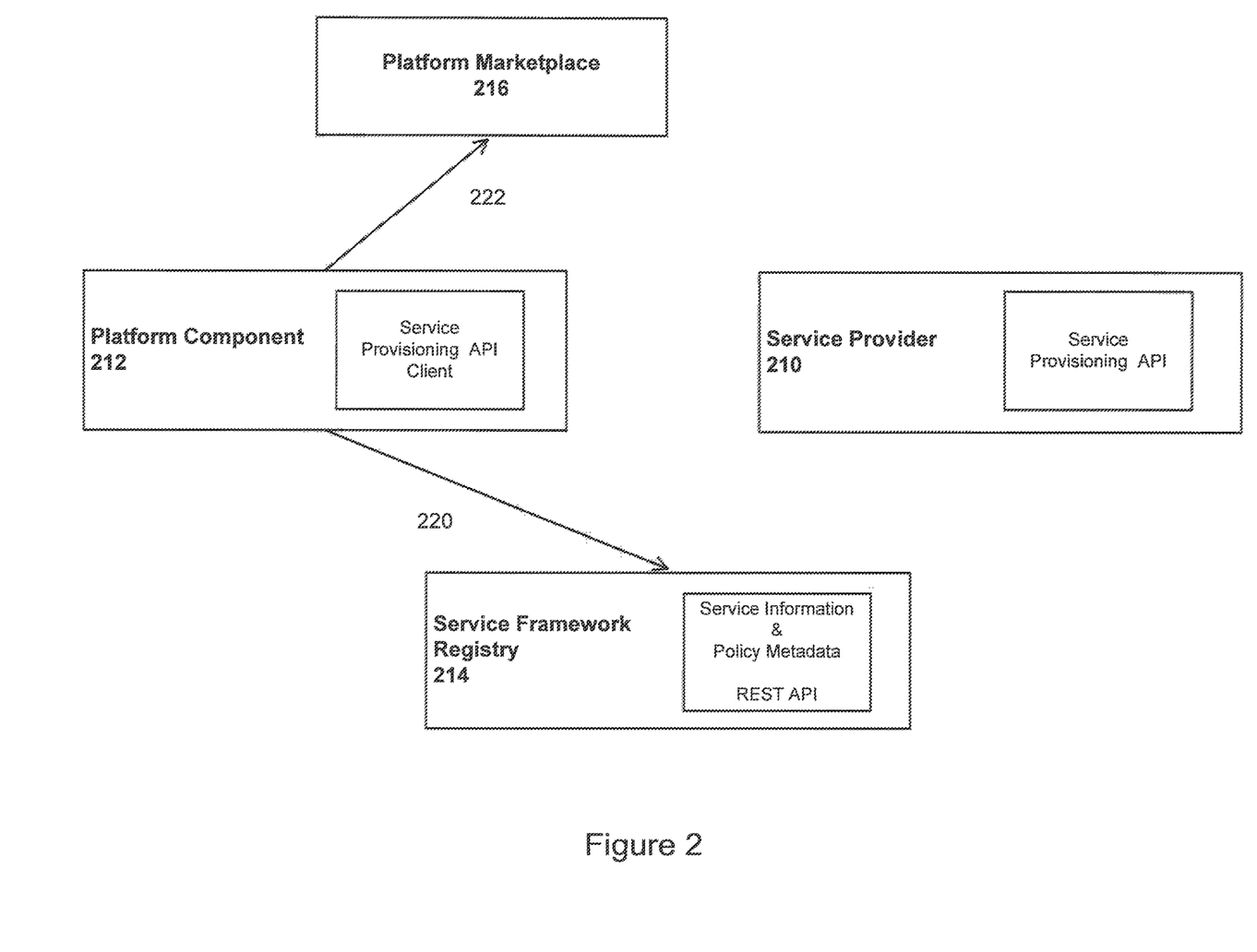
FIG. 2 illustrates an exemplary control plane, according to an embodiment of the present invention.

FIG. 2 illustrates an exemplary control plane, according to an embodiment of the present invention. FIG. 2 details service registration and filtering. As shown in FIG. 2, Service Provider (SP) may include a service provisioning API at 210. Platform Component (PC) may include a service provisioning API client as shown by 212. Service Framework Registry (SRF) may include a service information and policy metadata REST API as shown by 214. At 220, service synchronization may support filter and service promotion. At 222, PC may evaluate policy metadata and update platform marketplace 216, as shown by 222.

As shown in FIG. 2, SP API, protected using OIDC, may be registered with the Service Framework Registry (SFR). SFR broker information may be synchronized with the PC periodically, either synchronously or asynchronously. Once the synchronization is complete and the policy metadata allows the service to be consumed from the specific platform, the PC may expose the service, by interacting with a platform specific marketplace component, allowing users to consume services on the platform. Services may be made available on platforms based on the policy metadata in the SFR. This may be used to filter services based on characteristics of the platform (e.g., region, environment, etc.) and/or the type of service (e.g., multi-tenant services may not be made available in secure, restrictive environments, etc.). The ability to filter and scope services based on a multitude of characteristics may allow for service promotion across environments and presenting new services or upgrading existing services with zero-deployment effort across platforms.

Figure 3:
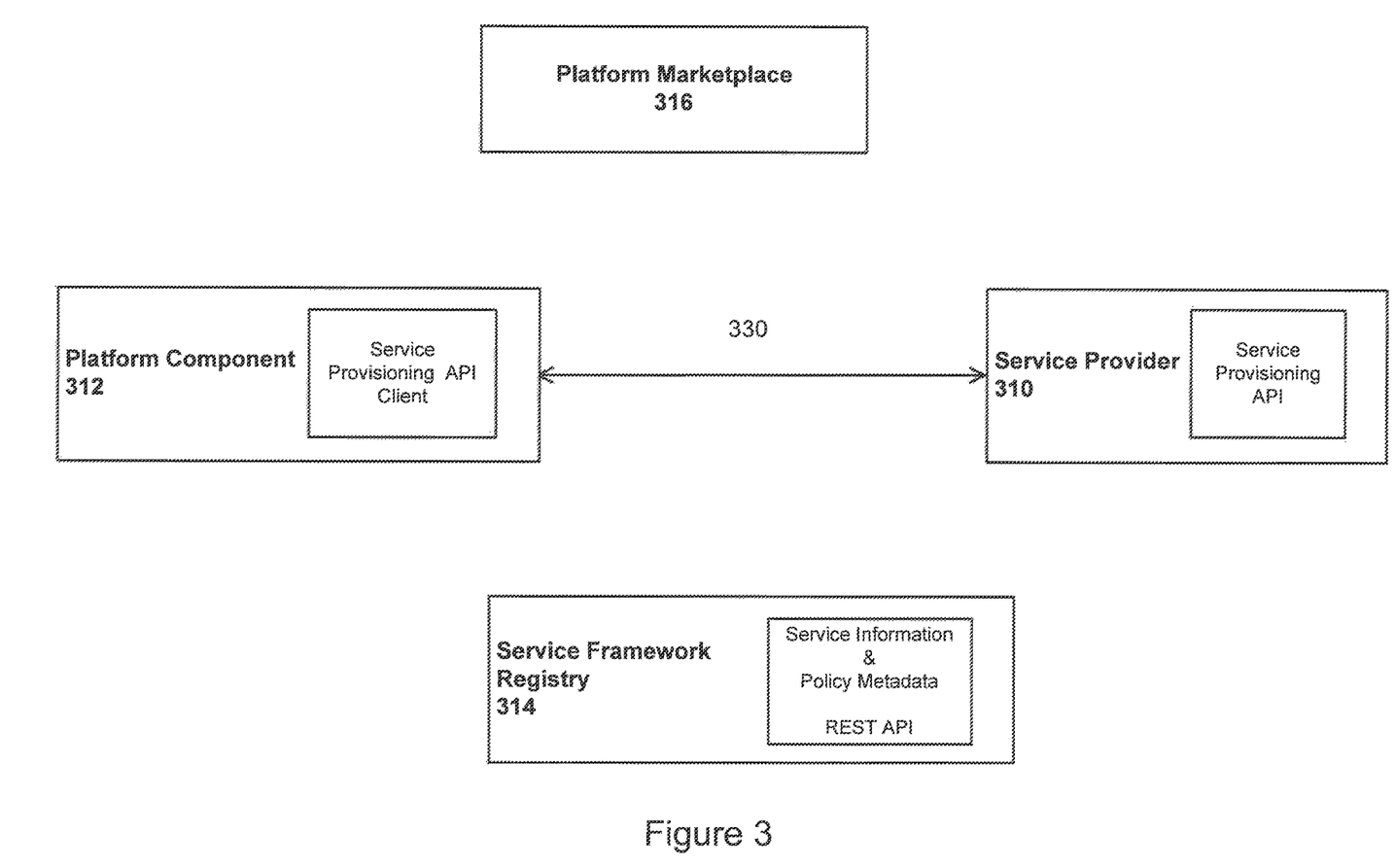
FIG. 3 illustrates an exemplary data plane, according to an embodiment of the present invention.

FIG. 3 illustrates an exemplary data plane, according to an embodiment of the present invention. FIG. 3 illustrates Service Provisioning and Consumption. As shown in FIG. 3, Service Provider (SP) may include a service provisioning API at 310. Platform Component (PC) may include a service provisioning API client as shown by 312. Service Framework Registry (SRF) may include a service information and policy metadata REST API as shown by 314. Connection 320 supports synchronously or asynchronously provisioning of service instance. In addition, applications may be enabled to communicate with provisioned Service Instance(s). Platform marketplace may be represented by 316.

As shown in FIG. 3, users may consume services by provisioning service instances interacting with the Platform. The PC may invoke the SP OSB API, with parameters passed in by the user. Additional request headers may be added by the PC for tracing, logging and validation purposes. The SP OSB API may receive the request, validate the payload and/or provision a service instance, either synchronously or asynchronously. In addition, once the service is ready to be consumed, the user may bind the service instance to an application, which may invoke the SP OSB API via the PC. This API call may return a payload including credentials and/or network information. The PC may encrypt credentials and make the necessary firewalls rules to allow for traffic to flow between applications and service instances.

The various embodiments of the present invention may be further extended to provide a wide range of features and functionality. An embodiment of the present invention may provide automated credentials injection in the service instances. The framework may inject transparently in the application runtime the credentials required to consume the service instance. The credentials may be accessed on the fly from a vault, e.g., an enterprise secret vault, in a transparent, secured manner. In this example, users do not manipulate secrets. The entitlements may be stored and consume where they are required, as in the application run time.

An embodiment of the present invention may provide advanced service scoping. According to an embodiment of the present invention, a service marketplace catalog may show services and/or plans meeting specific conditions. Conditions may include whether they are from a specific department, line of business, organization, etc. The service/plan may be available in a specific region, datacenter and/or other geographic location. The platform running the marketplace may be of a specific type and/or of a specific version. Service providers may fine tune their offering to meet the complex need of each consumer in their specific context (e.g., organization, datacenter, cloud service preference, etc.). For example, a more secured and expensive version of a service may automatically replace a standard version of a service for customers from a team that manipulates sensitive data, e.g., credit card information.

An embodiment of the present invention may provide improved observability, e.g., view of service health. An embodiment of the present invention may mandate service brokers and service instances to expose health and operational metrics endpoints. The marketplace may include each service/plans as well as their health across their deployments globally and/or within a certain location. For example, a user may challenge a decision to provision a service showing a history of health issues and further understand from the beginning why an application is not behaving as expected. An embodiment of the present invention may detect underlying services having issues. For example, improved observability provides a standardized way for a service provider to explore the health of their services.

An embodiment of the present invention may facilitate onboarding services through Service Provider Self Service Onboarding. For example, a Service Provider may onboard seamlessly and automatically a sandbox platform marketplace to test if the service and/or aspects of the service works as expected. Once satisfied, the Service Provider may request the framework owner to promote the service to a higher environment. An embodiment of the present invention achieves high velocity to onboard new service.

An embodiment of the present invention is directed to providing a Service Catalog and delivering service framework to new platforms. This expands the services that may be available on more platforms.

An embodiment of the present invention may provide improvements in billing through subscription usage model for services. For example, an embodiment of the present invention may provide an automated billing of service instances per hour or other time increment. Services Providers may specify more advanced billing model and specific, including number of GB used, network traffic, etc. This feature provides a capacity to set throttling, e.g., downsize a service instance if a predefined limit has been exceeded (or other threshold). An embodiment of the present invention seeks to facilitate and simplify the billing process that a service provider offers to customers thereby enabling a myriad of new commercial opportunities and business cases. For example, a service provider may offer a service and further specify a charge for the service.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A method that implements a framework for consumption of services for enterprise cloud platforms, the method comprising the steps of:
    implementing a platform component that builds, deploys and operates a plurality of cloud platform instances in a plurality of regions, wherein the platform component bridges each of the plurality of cloud platforms and service provider APIs, the platform component periodically syncing with a service framework registry to onboard one or more services for discovery and consumption;
    providing the service framework registry that stores data associated with one or more services that are whitelisted for consumption by each cloud platform instance and stores constraint and policy metadata for identifying one or more services location, one or more services environment, and a plurality of services restrictions and services privileges based on the one or more services location and one or more services environment; and
    providing a service instance repository that manages mapping of a plurality of instances of the one or more services to the plurality of cloud platform instances;
    wherein one or more service providers provide services, to be whitelisted, for execution on the cloud platform via the service provider APIs;
    wherein the platform receives a user request to consume one of the one or more whitelisted services that is approved for consumption based on the plurality of services restrictions and services privileges based on the one or more services location and one or more services environment, through an API call and in response, the platform returns a payload including one or more credentials;
    wherein the one or more credentials are automatically injected at run time in a service instance for the user request.

2. The method of claim 1, wherein the platform component uses a platform specific authentication mechanism.

3. The method of claim 1, wherein the platform component synchronizes with the service framework registry to onboard services to a marketplace component allowing for service discovery and consumption.

4. The method of claim 1, wherein the platform component scopes services based on one or more parameters comprising type, location, cloud platform type and environment.

5. The method of claim 1, wherein health and operational metric endpoints associated with the services are provided.

6. The method of claim 1, wherein the policy metadata is used to scope services by location or environment.

7. The method of claim 1, wherein the services comprise one or more of: data services, messaging services, logging services, monitoring services.

8. The method of claim 1, wherein a subscription usage model is applied to the service providers for services.

9. The method of claim 8, wherein the subscription usage model is applied as an automated billing service.

10. The method of claim 1, wherein the service providers onboard one or more services to a sandbox platform marketplace for testing.

11. A system that implements a framework for consumption of services for enterprise cloud platforms, the system comprising:

a platform component that builds, deploys and operates a plurality of cloud platform instances in a plurality of regions, wherein the platform component bridges each of the plurality of cloud platforms and service provider APIs, the platform component periodically syncing with a service framework registry to onboard one or more services for discovery and consumption;

the service framework registry configured to store data associated with one or more services that are whitelisted for consumption by each cloud platform instance and stores constraint and policy metadata for identifying one or more services location, one or more services environment, and a plurality of services restrictions and services privileges based on the one or more services location and one or more services environment and;

a service instance repository that manages mapping of a plurality of instances of the one or more services to the plurality of cloud platform instances;

wherein one or more service providers provide services, to be whitelisted, for execution on the cloud platform via the service provider APIs;

wherein the platform receives a user request to consume one of the one or more whitelisted services that is approved for consumption based on the plurality of services restrictions and services privileges based on the one or more services location and one or more services environment, through an API call and in response, the platform returns a payload including one or more credentials;

wherein the one or more credentials are automatically injected at run time in a service instance for the user request.

12. The system of claim 11, wherein the platform component uses a platform specific authentication mechanism.

13. The system of claim 11, wherein the platform component synchronizes with the service framework registry to onboard services to a marketplace component allowing for service discovery and consumption.

14. The system of claim 11, wherein the platform component scopes services based on one or more parameters comprising type, location, cloud platform type and environment.

15. The system of claim 11, wherein health and operational metric endpoints associated with the services are provided.

16. The system of claim 11, wherein the policy metadata is used to scope services by location or environment.

17. The system of claim 11, wherein the services comprise one or more of: data services, messaging services, logging services, monitoring services.

18. The system of claim 11, wherein a subscription usage model is applied to the service providers for services.

19. The system of claim 18, wherein the subscription usage model is applied as an automated billing service.

20. The system of claim 11, wherein the service providers onboard one or more services to a sandbox platform marketplace for testing.

* * * * *